(No Model.) 9 Sheets—Sheet 1.
E. M. LOCKWOOD.
MACHINE FOR CUTTING MATCH SPLINTS.
No. 600,085. Patented Mar. 1, 1898.
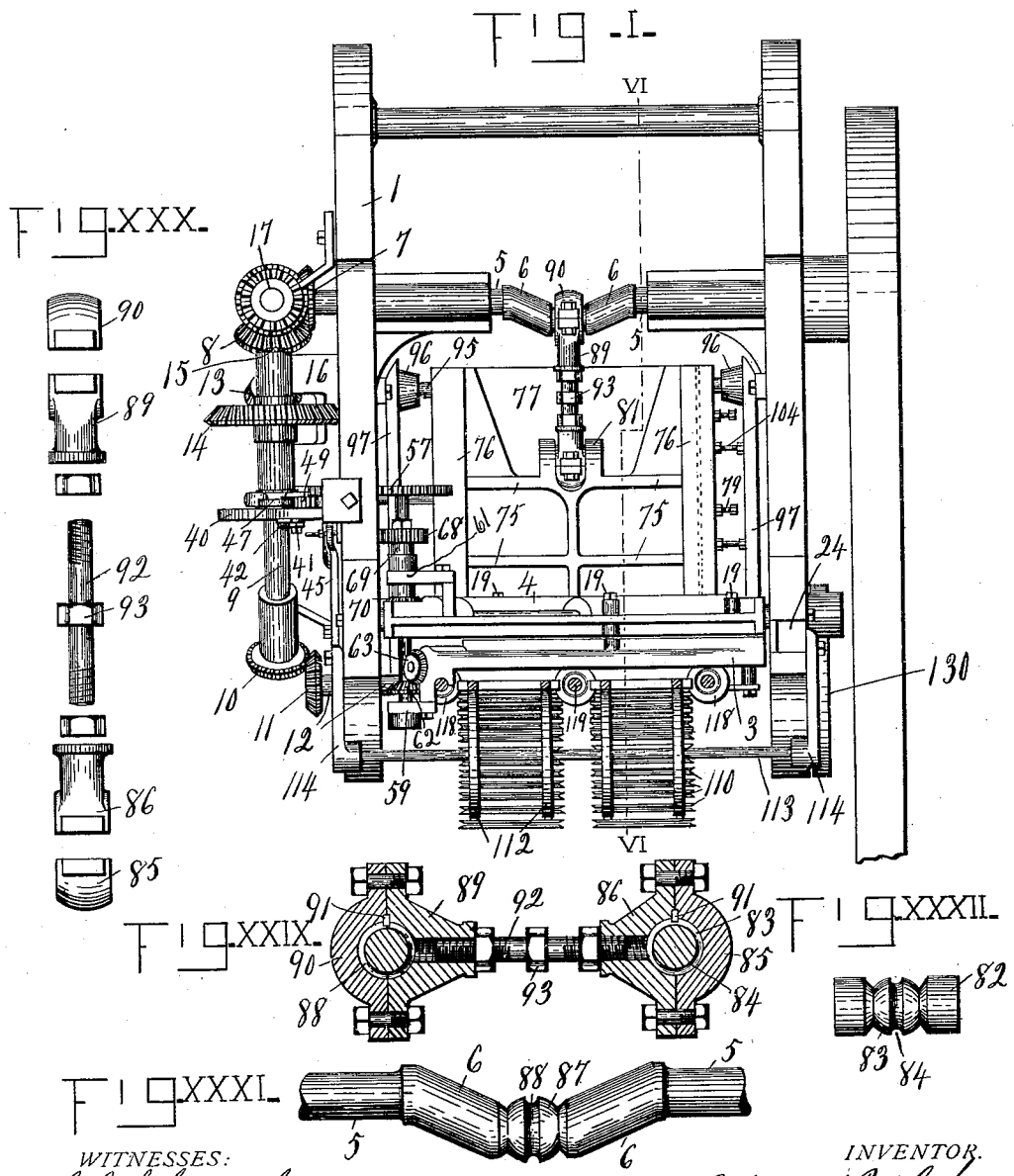

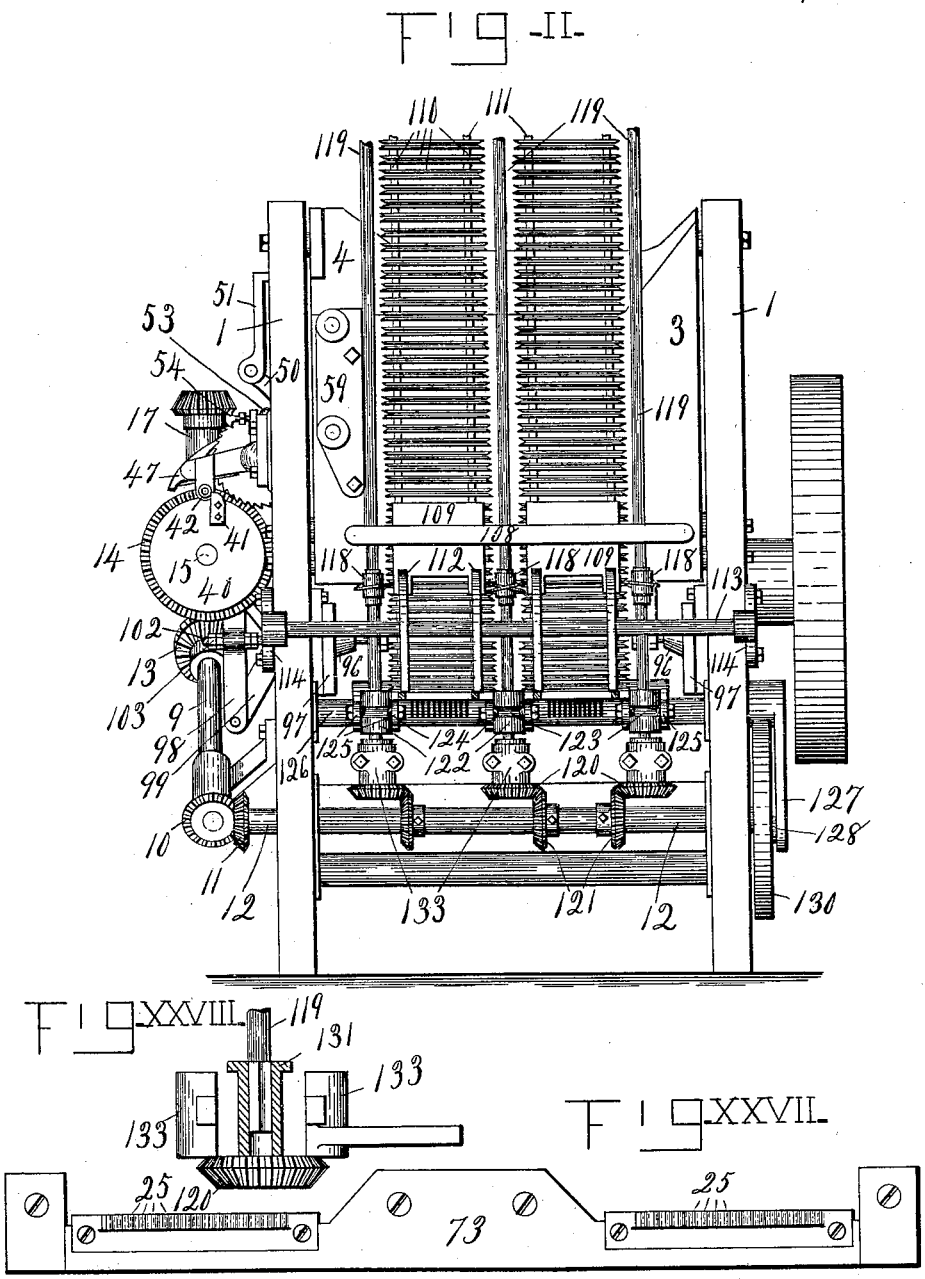

(No Model.) 9 Sheets—Sheet 3.
E. M. LOCKWOOD.
MACHINE FOR CUTTING MATCH SPLINTS.
No. 600,085. Patented Mar. 1, 1898.
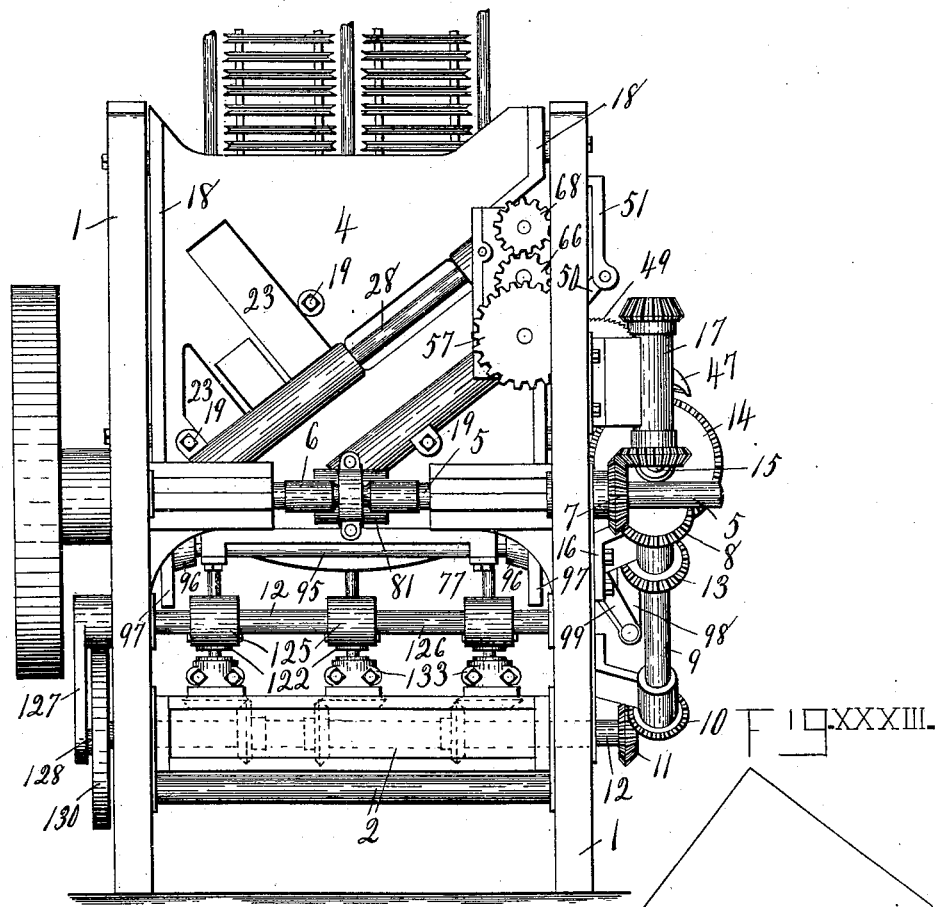
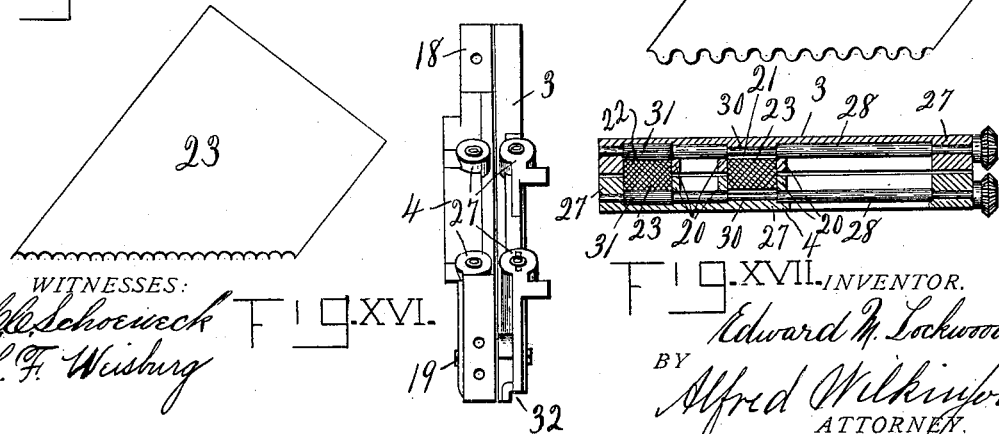

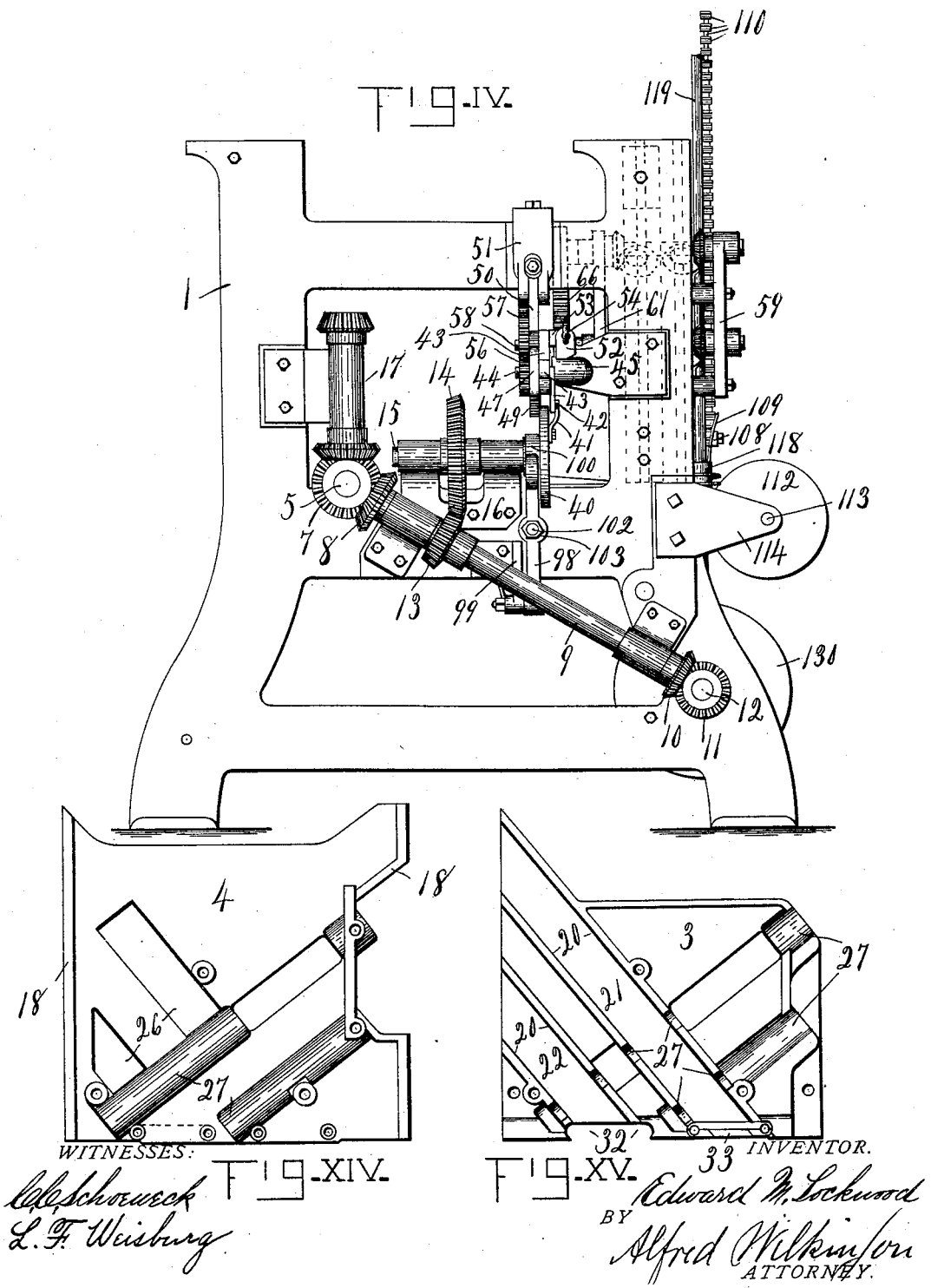

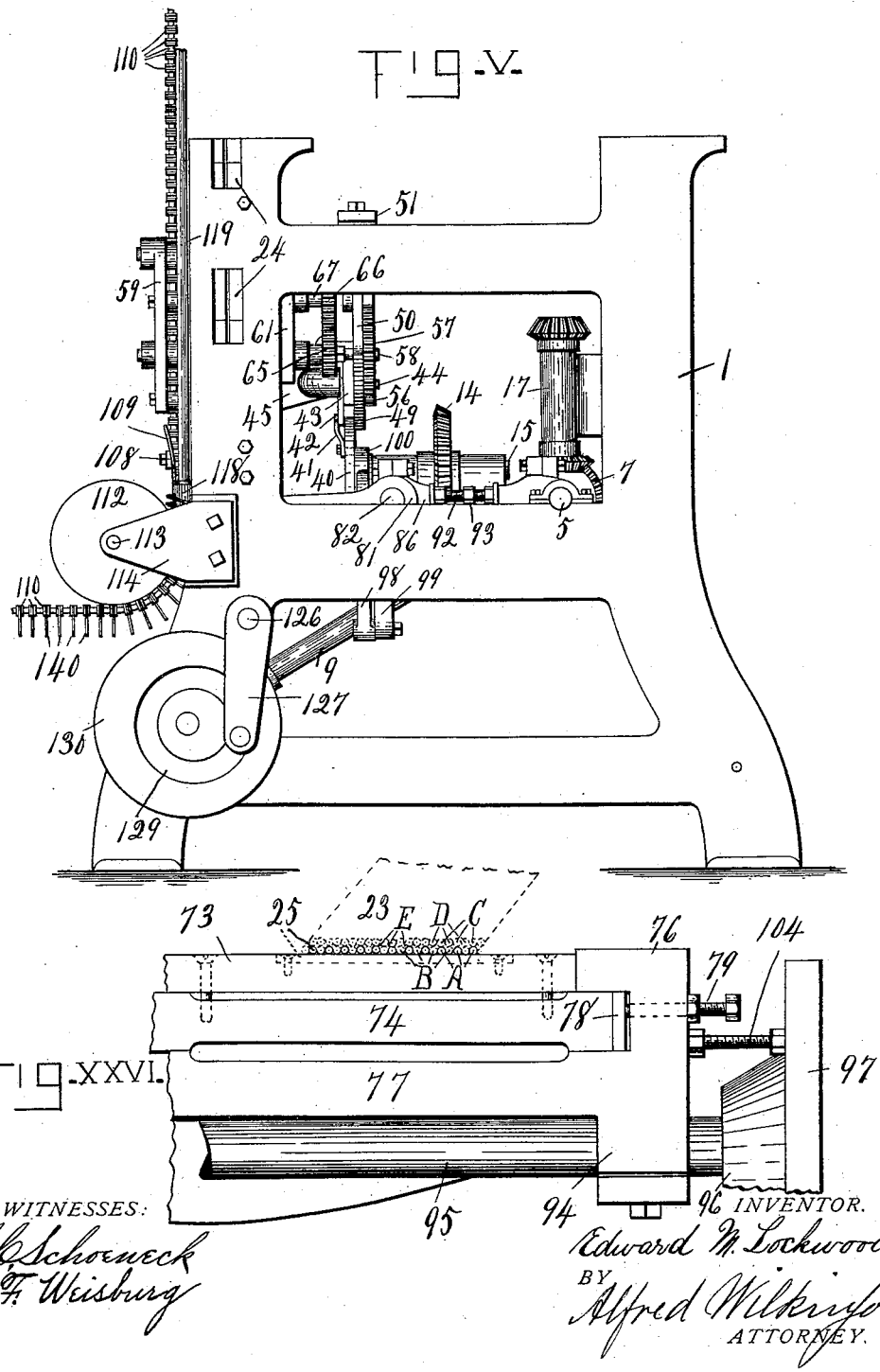

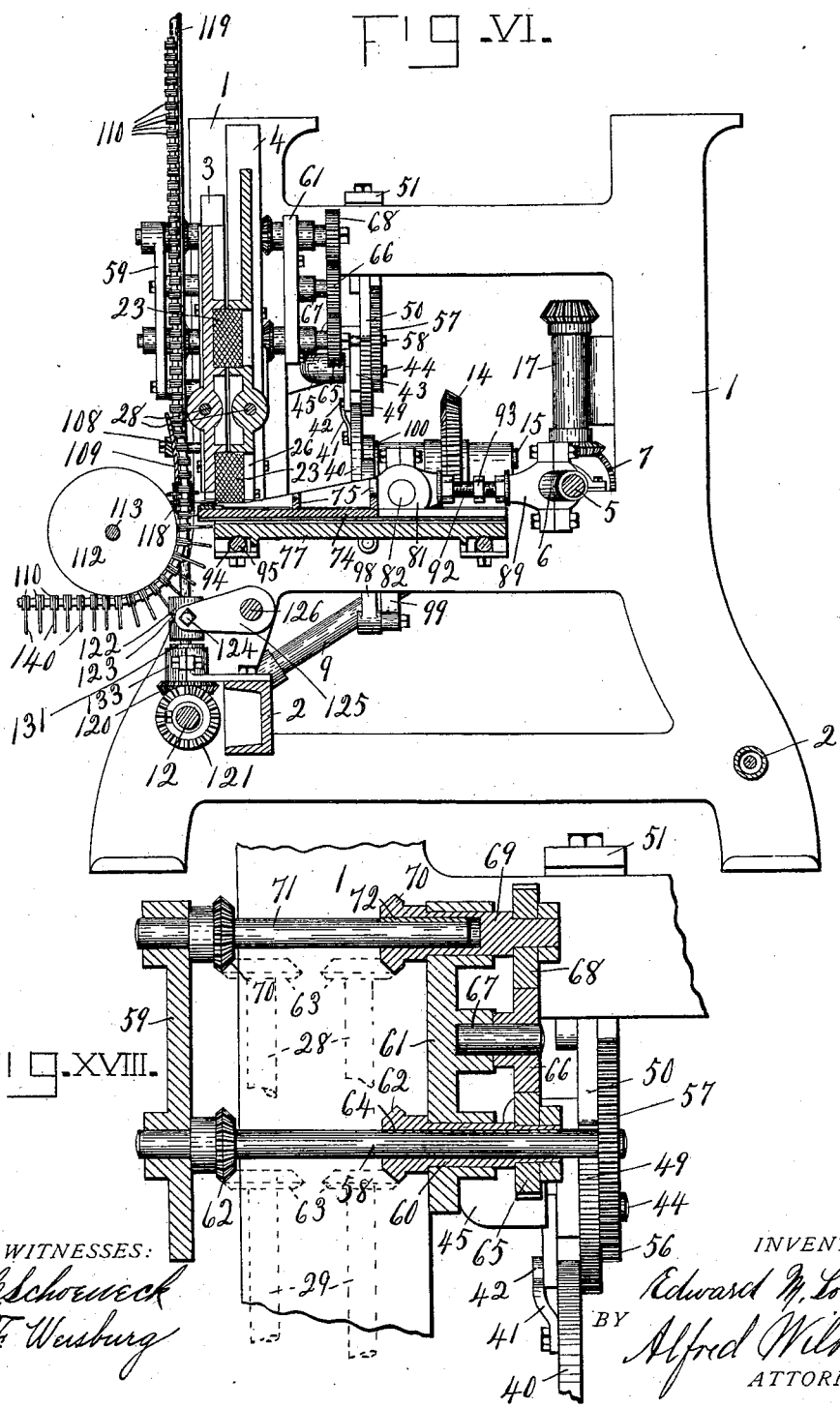

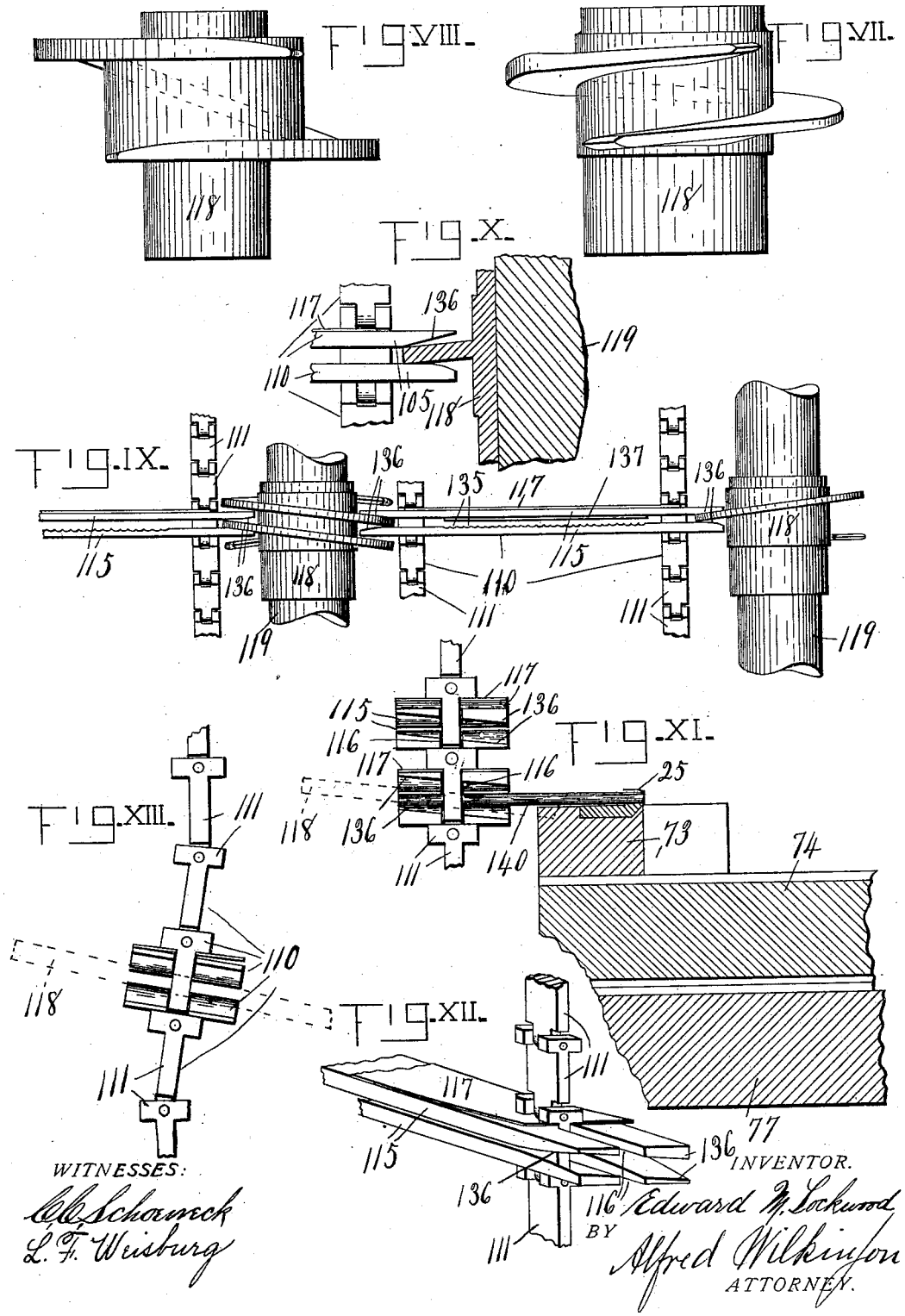

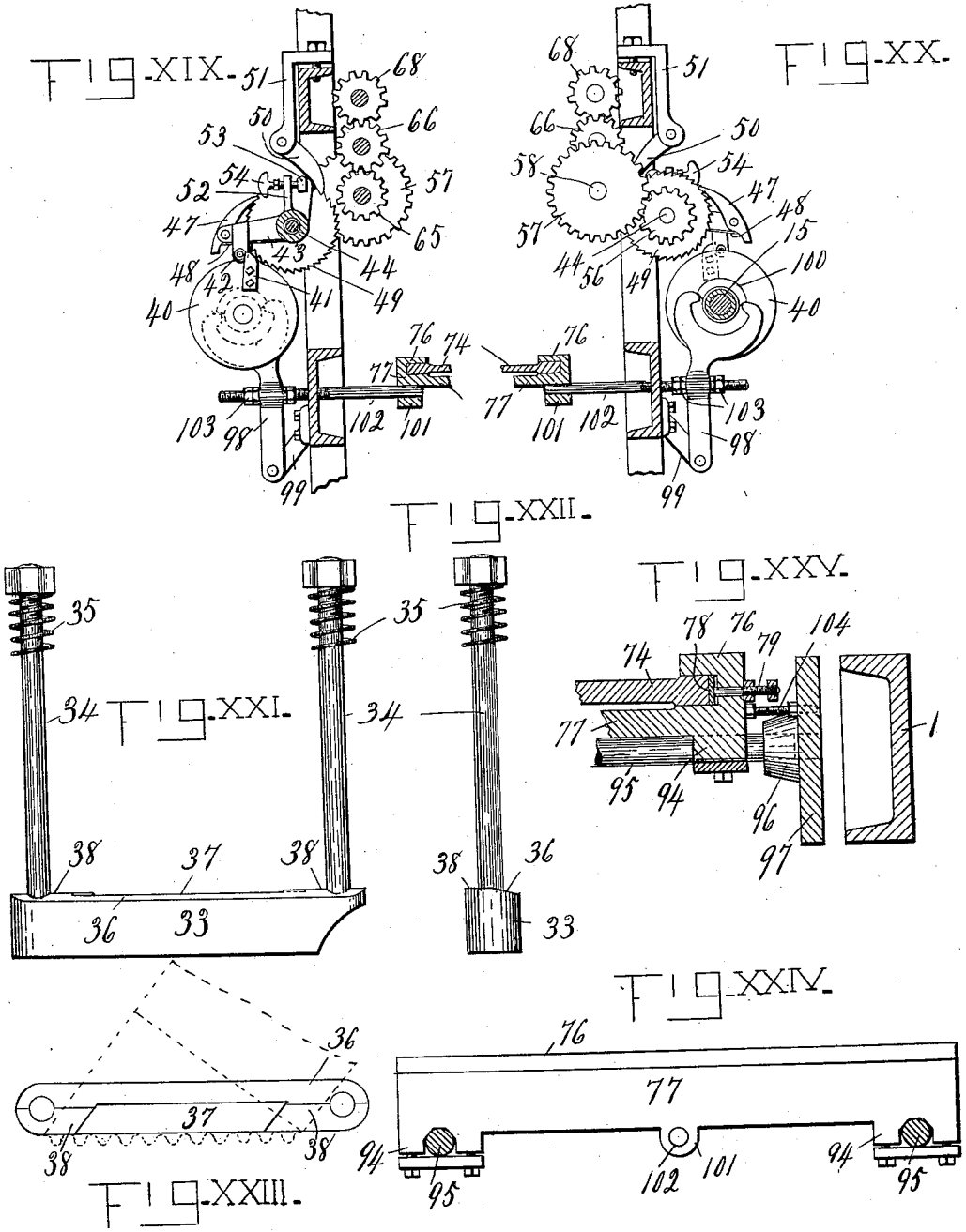

(No Model.) 9 Sheets—Sheet 9.
E. M. LOCKWOOD.
MACHINE FOR CUTTING MATCH SPLINTS.
No. 600,085. Patented Mar. 1, 1898.
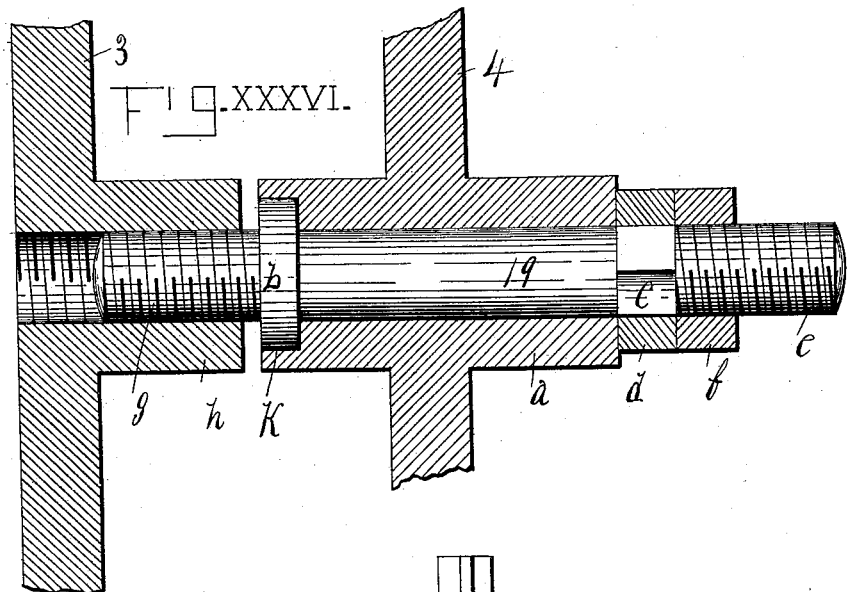
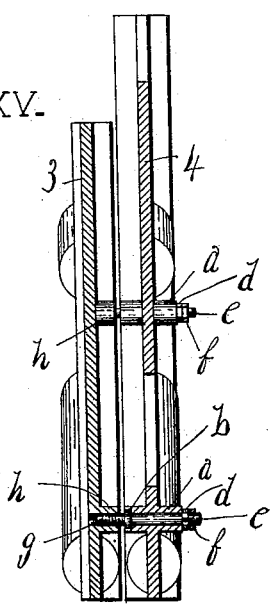
WITNESSES
INVENTOR.
Edward M. Lockwood
BY Alfred Wilkinson
ATTORNEY.

UNITED STATES PATENT OFFICE.

EDWARD M. LOCKWOOD, OF OSWEGO, NEW YORK.

MACHINE FOR CUTTING MATCH-SPLINTS.

SPECIFICATION forming part of Letters Patent No. 600,085, dated March 1, 1898.

Application filed May 27, 1897. Serial No. 638,009. (No model.)

*To all whom it may concern:*

Be it known that I, EDWARD M. LOCKWOOD, a citizen of the United States, residing at Oswego, in the county of Oswego and State of New York, have invented a new and useful Improvement in Machines for Cutting Match-Splints; and I do hereby declare that the following, in connection with the accompanying drawings, is a full, clear, and exact description of the invention.

My invention relates to improvements in machines for performing automatically the various mechanical operations of cutting match-splints from the block, receiving the cut splints in the slat-chains, and feeding them forward by rotating worms to remove the splints to other positions, where they are dipped, dried, and packed.

The essential features of novelty of my invention relate to the form of the worms, the form of the slats, and an absolutely new mode of operating the worms, by which a great improvement is effected in the operation of the machine, particulary in speed and steadiness. My invention also relates to improvements in the manner of feeding the blocks, operating the various parts of the machine, and in the detail construction and arrangement, by which it is made strong, simple, and durable.

My invention will be understood by reference to the accompanying drawings, in which the same reference numerals and letters indicate the same parts in all the figures.

Figure I is a top plan view of my improved machine, the vertical or worm shafts and portions of the slat-chains being shown in section. Fig. II is a front elevation of my machine. Fig. III is a rear elevation. Fig. IV is an elevation of the left side, the positions of some of the parts being indicated in dotted lines. Fig. V is an elevation of the right side of the machine. Fig. VI is a vertical section on line VI VI of Fig. I. Figs. VII to XIII illustrate my improvements in form and operation of the worms and slat-chains. All the figures on this sheet are substantially full size except Fig. IX. Fig. VII is an elevation of my improved form of worm. Fig. VIII is a similar elevation of the worm heretofore in use. Fig. IX is a front elevation of worms and portions of slat-chains, illustrating the engagement of worms with slats. Fig. X is an enlarged view of a portion of Fig. IX, showing the worm and worm-shaft in section. Fig. XI is a side elevation indicating the manner in which the cut splints are received between the slats. In this figure the knife, knife-bar, knife-plate, and bed-plate are shown in section, the thread of the worm in engagement with the slats being indicated in dotted lines. Fig. XII is an isometric view of a portion of the chain and a pair of slats, illustrating the peculiar form of the slats. Fig. XIII is an end elevation of the chain and form of slats heretofore in use, illustrating its objectionable operation. Figs. XIV and XV are elevations of the feed-plates detached, Fig. XIV of the outer or rear face of the rear feed-plate, and Fig. XV of the inner or rear face of the front feed-plate. Fig. XVI is a vertical elevation of the feed-plates detached from the machine and arranged together, seen from the left. Fig. XVII is an inclined section of the feed-plates, taken through one pair of rollers, showing that pair and the blocks in the channels. Fig. XVIII is a vertical elevation of the gearing and shafts transmitting intermittent motion from the ratchet to the feed-rollers, (indicated in dotted lines,) portions being shown in section. Figs. XIX and XX are respectively front and rear elevations of the ratchet and shifting-lever mechanism for intermittently feeding the blocks and shifting the bed-plate at each alternate cut, portions being shown in section. Figs. XXI, XXII, and XXIII are respectively a top plan view, a side elevation, and a face view of the spring-plate, the block being indicated in dotted lines in Fig. XXIII. Fig. XXIV is a side elevation of the bed-plate. Fig. XXV is a vertical cross-section of portions of bed-plate and knife-plate, showing the manner in which they are supported. Fig. XXVI is a corresponding front elevation showing the knife on the knife-bar and indicating in dotted lines the block and successive cuts. Fig. XXVII is a top plan view of the knife-bar detached, carrying the knives. Fig. XXVIII is a side elevation showing the box and connection between the lower end of a worm-shaft and its operating-gear, the parts being separated and the gear-hub shown in section. Figs. XXIX, XXX, XXXI, and XXXII are respectively a longitudinal section showing the connection between the main or crank-shaft and knife-plate, a top plan view of the adjustable connection between the crank-shaft and wrist-pin with the parts separated, an elevation of the double crank of the main shaft, and an elevation of the wrist-pin. Figs. XXXIII and XXXIV are elevations of the block, showing, respectively, the first and second cuts in the same plane. Fig. XXXV is an enlarged vertical cross-section of the block-feed plates near the right, showing the means by which the front plate is sustained on the rear plate and the distance between the plates varied. Fig. XXXVI is a portion of the preceding figure further enlarged, showing one of the bolts for sustaining the front block-feed plate and for adjusting it with relation to the rear block-feed plate.

*Frame and operative mechanism.*—1 1 are the two sides of the frame, secured together and braced by various cross-bars or braces 2 2 2 2, by the block-feed plates 3 4, and by various shafts hereinafter described. 5 is the main or crank shaft journaled in rear of frame and formed with crank 6, by which reciprocating motion is communicated to knives. Power is communicated to said shaft in any desirable way, as by pulley and belt secured thereto and shown in Figs. I, II, and III on the right of machine, as herein described. On one end of main shaft outside of frame is secured a bevel-gear 7, engaging with a corresponding gear 8 on inclined shaft 9, which communicates motion through bevel-gear 10 on its lower end, engaging with bevel-gear 11, to the front shaft 12, journaled in the frame, by which the worms, chains, &c., are operated, Fig. IV. By means of a middle pinion 13 on this inclined shaft 9 engaging with gear 14 on short shaft 15, journaled in bracket 16, secured to frame, motion is communicated to the bed-plate through intermediate mechanism, by which it is shifted from side to side, so as to expose different portions of the block to the knives for the alternate cuts, and by other intermediate mechanism intermittent motion is communicated to the feed-rollers by which the blocks are fed. A vertical shaft 17 is shown carrying bevel-gear engaging with gear 7 for transmitting motion to a match-box-filling machine, which may be arranged above the machine herein described.

*Block-feeding mechanism.*—This consists of block-feed plates forming block-channels between them, feed-rollers journaled in the plates, and mechanism for intermittently rotating the rollers and feeding the blocks down step by step to the knives. These block-feed plates differing slightly in form, as best shown in Figs. XIV to XVII, are arranged vertically across the machine near its front, where the rear plate 4, provided with flanges 18 18, is secured to the frame. The front plate 3 by means of bolts 19 19 19 is secured to the rear plate adjustably that the distance between the plates may be varied to receive blocks of different thickness, Figs. XXXV and XXXVI. These plates are formed on their inner faces with corresponding diagonal ribs 20 20, by which when the plates are secured in position inclined channels 21 and 22 are formed to receive the blocks 23 23, which are introduced through openings 24 24 in the side of the frame and to guide them downwardly to knives 25 25, by which simultaneously two rows of splints are cut. The rear plate is formed with openings 26 26, through which the blocks may be withdrawn. Both plates are provided with journal-bearings 27 27 27 for the feed-rollers 28 28 and 29 29, which, arranged at right angles to the channels, grip the blocks and feed them downwardly to the knives. It will be seen that the lower and shorter pair of rollers 29 29 operate on the block in the upper and longer inclined channel 21, and the upper and longer rollers 28 28 operate on the block in the shorter and lower channel 22, and are made smaller at 30 30, where they cross the upper channel 21, so as not to engage with the blocks passing through that channel. Both pairs of rollers are preferably roughened or corrugated on that portion 31 31 which engages with the block, as shown in Fig. XVII. The lower portion of each block-feed channel in the front plate is cut away at 32, in which is arranged the spring-plate 33, secured adjustably and yieldingly to the rear feed-plate 4 by bolts 34 34 and springs 35 35, strung on these bolts between the nuts and the rear face of the rear plate. The function of this spring-plate is to engage with the small uncut portion of the block 23 after it has passed from the grip of the rollers to prevent its dropping down prematurely to clog the knives, &c., except as fed forward by the block coming after it. As shown in Figs. XXI to XXIII, the upper portion 36 of the inner face of the spring-plate, which engages with the blocks, is beveled better to receive the blocks varying in thickness, and the lower portion centrally cut away on an incline at 37 to a slight depth, the small remaining bit of the block being sufficiently held by the plane ends of the lower portion 38 38. In Figs. XIV and XV the spring-plate is indicated in position in the cut-out 32 at the lower end of channel 21 and is omitted from cut-out in channel 22.

Many simple means will occur to the mechanic for adjusting front plate 3 with relation to rear plate 4 by means of bolts 19 19. In Figs. XXXV and XXXVI, I have shown one simple means that I have adopted for this purpose. This consists in forming plate 4 with bearings *a*, in which are sustained the bolts 19, formed with an integral collar *b*, a squared or angular portion *c*, to which is fitted the sleeve *d*, having an angular exterior, a threaded portion *e*, to which is fitted the nut *f*, and at the opposite end a threaded portion *g*, engaging with bearing *h* on front plate 3. It will be seen that bolt 19 is thus supported rotatably, but otherwise immovably, in plate 4, the position of the bolt in the bearing *a* being maintained by integral collar *b*, fitting depression *k* at one end, and by the sleeve *d* and nut *f* at the other. When it is desired to change the distance between the plates 3 and 4, the sleeve *d* may be turned by the wrench by which the bolt 19 is rotated, in one direction moving the plate 3 from and in the other direction toward plate 4.

*Mechanism for operating the feed-rollers,* Figs. II, IV, V, XVIII, XIX, and XX.—To the front end of the short shaft 15 is secured the wheel 40, carrying on its front face a cam projection 41, which at each rotation strikes against an antifriction-roller 42 on the outer end of the lever 43, pivotally secured on pin 44 on bracket 45, by which the outer end of said lever-carrying pawl 47 is thrown up at each rotation of said wheel, and the pawl held by spring 48 in engagement with ratchet 49, journaled also on pin 44, rotates said ratchet a certain distance at each revolution of the wheel, backward motion being prevented by dog 50, carried on a vertically-adjustable bracket 51. Secured to ear 52 on bracket 45 is adjusting-screw 54, which bears against extension 53 on upper arm of lever 43 to elevate or depress the other arm and pawl, adjusting its engagement with the ratchet and regulating rotation thereof, Fig. XIX. Secured to ratchet 49 or on its pin 44 is pinion 56, meshing with gear 57, secured on rear end of shaft 58, journaled in bracket 59, which is secured to front feed-plate 3, Fig. XVIII. On said shaft and on hollow shaft 60, journaled in bracket 61, (secured to rear face of rear feed-plate 4,) are secured the corresponding bevel-gears 62 62, which, engaging with gears 63 63 on upper ends of feed-rollers 29 29, communicate motion thereto. A sliding connection is made between shaft 58 and hollow shaft 60, as by feather 64 and spline, so that they will be rotated together, while the distance between gears 62 62 is varied as feed-plate 3 is adjusted in relation to feed-plate 4. On the rear end of said hollow shaft 60 is secured a spur-gear 65, meshing with intermediate spur-gear 66, journaled on pin 67, secured in rear of bracket 61. This intermediate gear in turn meshes with spur-gear 68 on an upper hollow shaft 69, corresponding to shaft 60 and carrying a bevel-gear 70, whose mate is carried on shaft 71, journaled in support 59, and by its opposite end in the hollow shaft 69, with which it makes a sliding connection by feather 72 and spline corresponding to connection between shafts 58 and 60. These bevel-gears 70 70 correspond to bevel-gears 62 62 and engage with the upper bevel-gears 63 63, secured on the ends of the upper feed-rollers 28 28.

*Knives and knife-operating mechanism.*— My invention is here shown embodied in a double form of machine, by which two rows of splints are cut at once, it being evident that the machine may be so constructed as to cut one row or more than two, if desirable. The knives 25 25 of well-known form are bolted to knife-bar 73, preferably of the form here shown, which is secured to front end of knife-plate 74—a comparatively thin plate stiffened by ribs 75—and fitted to reciprocate in guides 76 76 on edges of bed-plate 77, on which it is supported, Figs. XXVI and XXVII. On one side an adjusting-strip 78 is interposed between edge of knife-plate and inner edge of bed-plate guide, which may be adjusted by set-screws 79 79, tapped into edge of bed-plate. The knife-plate 74 is provided with rearwardly-extending perforated ears 81 81, in which is inserted the wrist-pin 82, (shown separate in Fig. XXXII,) its rounded center 83, provided with circumferential groove 84, forming the ball of the ball-and-socket joint. 85 and 86 are the members of the socket of that joint fitted to the ball 83 and bolted together. The main shaft 5 is formed with the double crank 6, Figs. I and XXXI, which is also centrally formed in a ball 87, with groove 88, to which are fitted and bolted the members 89 and 90 of the rear socket connection, corresponding to the socket connection secured as just described to the knife-plate ears. Pins 91 91, secured between socket members of respective ball-and-socket joints, engage with these grooves 84 and 88 to preserve balls and sockets in better relation. An adjustable connection is made between the knife-plate and crank by means of the connecting-rod 92, provided with a nut-head 93 and having its ends provided with reverse threads engaging with corresponding threads on the members 86 and 89 of the ball-and-socket joints, by which means the position of the knife when making the cut may be adjusted, Figs. XXIX and XXX.

As just stated, the knife-plate 74 is supported on bed-plate 77, which is shifted a short distance from side to side by the following means, in order to shift the knives so that they will cut a different portion of the block. The bed-plate is provided on its under side with grooved flanges 94 94, in which are clamped cross or bed rods 95, Figs. XXIV, XXV, and XXVI. These rods fit and slide in studs or bosses 96 on side plates 97 97, secured to inner sides of frame, thus permitting the side shift of the bed-plate, which is effected by the shifting lever 98, secured to arm 99 on frame and provided with jaws which engage with cam 100 on rear face of wheel 40, Figs. XIX and XX. To ear 101 on under side of bed-plate is attached rod 102, passing through shifting lever and adjustably secured thereto by nuts 103 103, thus connecting the bed-plate to the shifting lever. During half the rotation of the wheel 40 the cam, being turned outwardly, presses against the outer jaw of the shifting lever, thus shifting the bed-plate, knife-plates, and knives outwardly during the half-rotation. It shifts them inwardly during the other half-rotation by bearing against the inner jaw. The extent of shift is controlled by the size of the cam, but I provide in addition set-screws 104 104, tapped into side plate 97 on right-hand side positively to limit the shift.

Gear 14 is so proportioned to pinion 13 on inclined shaft 10 that short shaft 15, wheel 40, and cam 100 will rotate once while main shaft 5 is rotating twice, with the result that the knives will be shifted for each cut, so that the cutters of the knife will strike the block and cut the splints 140 exactly between the preceding cut, Figs. IV and XX. The object of this is to utilize the whole block practically without waste, and is illustrated in Fig. XXVI, in which four successive cuts are indicated, the first in full lines showing the position of the knife for the first cut A, the three succeeding cuts by the letters B, C, and D. The knife having made the cut A is shifted on the bed-plate and then makes the cut B. It is then shifted back, the block is fed down one step, and the cut C is made directly above A. Then at the next shift the knife on the same level makes the cut D. The small diamond-shape uncut portions of the block are indicated by the letters E E and amount to very little. To make this clearer I have added Figs. XXXIII and XXXIV, the first showing a block after one row of splints has been cut from its lower end—that is, the row A—and Fig. XXXIV showing the end of the block after the double cut A and B has been made.

*Slat-chains and feeding mechanism.*—This is the important feature of my machine, involving a new movement, by which the operation of the machine is improved and its speed increased. 110 110 are the slat-chains by which the cut splints 140 are carried from my machine to the mechanism for dipping and drying and thence to the machine for automatically boxing the finished matches, Figs. II and VI. These slat-chains are composed of the endless metallic chains 111 111, supported on wheels 112 112, secured on shaft 113, journaled to front of frame and on rotating sprockets, (not shown,) by which the slat-chains are continuously fed. Fitted to these endless chains and supported thereon are the pairs of slats 115 115, having slots 116 116 and springs 117 of any desirable form for forcing the slats of each pair together to grip the splints, Figs. IX to XII. To the front bar 108 are secured the guide-plates 109 109 for maintaining the slat-chains in proper position to engage with worms 118 118 and to receive splints from knives, there being a limited amount of slack in the chains, permitting the portion of the chains adjacent to the knives to be intermittently fed by the worms and other mechanism, hereinafter described, Figs. II and VI. The worms are secured on vertical worm-shafts 119 119, provided with gears 120 120, engaging with corresponding gears 121 121 on front shaft 12, operated from inclined shaft 9. On the worm-shafts 119 119 are secured collars or circular projections 122 122, formed with circumferential grooves 123, with which engage studs 124 124 on ends of double arms 125 125, secured to rock-shaft 126. These studs may be formed by screws inserted through the ends of the arms, Figs. II and VI. The rock-shaft is provided with a rock-arm 127, carrying an antifriction-roller 128 on its end, engaging in cam-groove 129 of wheel 130, secured to shaft 12, so formed and arranged as to rock the rock-arm, by which the worm-shafts 119 119 and worms 118 118 are temporarily raised during about half of their rotation to counteract the feed of the worms and during the other half of their rotation are carried down to first position, carrying with them the slat-chains, which are also advanced by the rotation of the worms, Fig. V. These worm-shafts are squared or provided with feather on their lower ends to engage with hub 131 of gears 120 120, which are sustained in boxes 133 133, by which a sliding connection is formed between these gears and the worm-shafts, so that the shafts and worms may be elevated and depressed by the action of the rock arm and shaft while continually and uniformly rotating, Fig. XXVIII.

The worms of prior machines were made with a portion substantially horizontal, commonly the ends, as shown in Fig. VIII, so as not to feed the chain when the slats were engaged with that portion of the worm, it being necessary for them to remain momentarily motionless at the instant of receiving the splints from the knives. It being necessary to feed the slat-chains a certain distance at each rotation of the worms and a portion of the old worms being substantially horizontal for the reason just described, it is evident that the chains can be fed during about half only of the rotation of the worms, and therefore the worm is formed with quite a sharp pitch throughout about one-half of its length. From this construction of worm the speed of operation is limited, it not being possible to feed the chains by means of a worm with such a sharp pitch as fast as one with a more gradual pitch. The result of great speed would be to strain the slats and chains, constantly shaking them with danger of shaking out the splints. In fact in the operation of a machine of this old construction there is a constant shake to the chain, which is overcome or much decreased in my machine.

My worm (shown full size in Fig. VII) is formed with a uniform pitch from end to end, and as its size and distance between its threads are about the same as in the old worm the pitch or inclination of the thread is much more gradual than that of the old worm. My worm therefore tends to feed the chains uniformly and constantly during its entire rotation, but more slowly on account of its more gradual pitch. It therefore may be run much faster with less strain on the chains. During about half of its rotation the feed is counteracted by the elevation of worm and worm-shaft by means of rock-shaft and rock-arm engaging with collar on worm-shaft, which elevation equals in speed and extent the downward feed of chains by worms. During the remainder of its revolution the worm operates to feed the chain, and instead of this being counteracted by elevation it is accelerated by the depression of the worm carried down by the downstroke of rock-arm, so that the worm engaging with the slats feeds the chains with a double motion, rotary feed, and a straight downward pull, which permits a great increase in speed and consequently in product.

By a simple change in the form of the ends of the slats I have increased the steadiness and consequent rapidity of operation. Like the prior slats mine are preferably formed with the face 135 of one corrugated and the face 137 of the other covered with felt or cloth, the better to grip and hold the splints, and with their ends beveled to admit the end of the worm, preferably sharpened. The difference lies in this bevel. In the old slats the ends are beveled parallel to the width of the slat, so that the rather sharply-pitched worm engaging therewith twists the chains out of the true line, as best shown in Fig. XIII, resulting in strain and constant shake of chain. My slats, as best shown in Figs. XI and XII, also in Figs. IX and X, are formed with their ends beveled on an incline to fit the incline of worm, by which a straight and true feed of chains is preserved without twist or shake. This is better accomplished with my form of worm having a less inclination.

In the drawings the side worms are shown with a single thread and the middle worm with a double thread to engage with both slat-chains.

*Mode of operation.*—The mode of operation of my machine will be understood without much further explanation. The blocks are inserted in the channels and fed down by the intermittent action of the rollers, one step for two cuts or strokes of the knife, the extent of feed being regulated by the adjusting-screw bearing against the lever, so as to feed the block sufficiently for one double row of splints to be cut off the lower edge. The splints having been cut by the backward movement of the knife on the return stroke, the cut splints, which are held in the knife, extending forwardly therefrom are inserted between the slats, which have been separated by the worm and are momentarily motionless, the feed thereof by the worm being momentarily counteracted by its corresponding elevation. The worm then engages with the succeeding pair of slats, and disengaging from the first pair they grip the splints and hold them as the knife starts back for the next cut. The splints being then held in the slats the chains are fed forward by the engagement of the worms with the second pair, bringing them into position for receiving splints, and by the continuous operation of the sprockets referred to, but not shown, the splints in the first pair of slats and in the succeeding pairs are carried away to the position in which the other operations of dipping, drying, and filling the boxes are performed.

As before stated, the gears are so proportioned that the blocks are fed down one step while the knife-plate is reciprocating twice, so that two rows or a double row of splints are cut from the block in the same horizontal plane and that the worms shall be rotated once for each cut of knife.

Having thus fully described my invention, what I claim, and desire to protect by Letters Patent, is—

1. In a match-splint-cutting machine, feed-worms and a slat-chain for receiving and removing the splints, having in combination endless metallic chains, slats supported thereon in pairs, having their ends obliquely beveled at an angle corresponding to the pitch of the feed-worms, means for supporting the chains and means for supporting and rotating the worms.

2. In a match-splint-cutting machine, endless slat-chains for receiving and removing the splints, consisting of pairs of metallic chains and slats of corresponding form secured thereon in pairs, said slats having their ends obliquely beveled at an angle corresponding to the pitch of the feed-worms to engage with the worms, and in combination therewith worms of uniform pitch carried on vertical shafts and means for rotating said shafts and worms.

3. In a splint-cutting machine, the combination of metallic chains arranged in pairs, rotating supports therefor, slats secured and carried on said chains in pairs of corresponding form, said slats having the contact-face of one corrugated, and of the other covered with yielding material such as felt, and having their ends outwardly extending beyond the chains beveled at a small angle to their flat surfaces corresponding to the pitch of the feed-worms to engage with said worms, a spring in connection with each pair of slats also supported on said chains for maintaining the slats in contact; worms provided with threads of uniform pitch, longer than one full turn, and having thin or sharpened ends for engaging between the beveled ends of the slats to force them apart for receiving the splints, and to feed the chains; vertical shafts supporting said worms and means for rotating said shafts.

4. In a match-splint-cutting machine, the combination of endless chains, rotating supports therefor, slats arranged on said chains in pairs for receiving between them and removing the cut splints, feed-worms engaging with the ends of said pairs of slats, shafts supporting said worms, means for rotating said shafts and worms, and means for elevating said shafts and worms temporarily during a portion of each rotation to counteract the feed of the chains by the rotation of said worms.

5. In a machine for cutting match-splints, the combination of endless chains, slats arranged thereon in corresponding pairs for receiving and removing the splints, feed-worms supported on vertical shafts for engaging with the ends of said slats to force them apart and to feed said slats and chains, means for rotating said shafts and worms, and means for alternately elevating and depressing them during each rotation.

6. In a machine for cutting match-splints, endless chains carrying pairs of slats, means for supporting the chains, feed-worms of uniform pitch engaging with said slats, mechanism for supporting and rotating the worms to feed the chains, and means for intermittently moving said worms in the direction of the feed of the chain.

7. In a machine for cutting match-splints, mechanism for receiving and removing the cut splints, having in combination endless chains, rotating supports therefor, slats supported thereon in pairs, rotating feed-worms to engage with the ends of said slats, shafts supporting said worms, collars secured on said shafts, arms secured on a rock-shaft and engaging with said collars, and means for rocking the rock-shaft to elevate the vertical shafts and worms during a portion of each rotation, and means for rotating continuously said vertical shafts and worms.

8. In a machine for cutting match-splints, mechanism for receiving and removing the cut splints, having in combination endless chains, slats supported thereon in pairs, springs, rotating feed-worms to engage with the ends of said slats, vertical shafts supporting said worms, collars provided with circumferential grooves secured on said vertical shafts below the worms, a horizontal rock-shaft provided with arms engaging with said grooves, means for rocking the rock-shaft to elevate shafts and worms temporarily during rotation, and means for continuously rotating said shafts and worms.

9. In a machine for cutting match-splints, mechanism for receiving and removing the cut splints, having in combination endless chains, slats supported thereon in pairs, rotating feed-worms to engage with the ends of said slats, vertical shafts supporting said worms, collars provided with circumferential grooves secured on said vertical shafts below the worms, a horizontal rock-shaft carrying double arms provided on their ends with pins engaging with said grooves, a rock-arm secured to the outer end of the rock-shaft provided with an antifriction-roller engaging with the cam-groove on a wheel secured to the end of the horizontal front shaft, bevel-gears sustained in boxes and adapted to receive squared lower ends of vertical shafts to make a sliding connection therewith, and bevel-gears on said front shaft engaging with said bevel-gears.

10. In a machine for cutting match-splints, the knives of usual form, and mechanism for reciprocating said knives, having in combination a knife-plate supporting the knives, a bed-plate provided with guides on its edges for receiving and supporting the knife-plate, suitable supports for supporting said bed-plate on the frame, ears on the knife-plate, a wrist-pin provided with a spherical center and circumferential groove secured to said ears, a main shaft provided with a double crank having a corresponding spherical center and circumferential groove, a connecting-rod consisting of socket members fitted and secured to said spherical portions with pins engaging with said circumferential grooves, a rod reversely threaded for engaging with said socket members and connecting the crank-shaft to knife-plate, and mechanism for shifting said bed-plate from side to side in order to shift the knives to cut different portions of the block.

11. In a match-splint-cutting machine, the knives of usual form and mechanism for supporting and reciprocating said knives to cut the splints from the downwardly-fed blocks, having in combination the knife-plate supporting the knives provided with rearwardly-extending ears, an operating-shaft provided with a double crank, an adjustable connecting-rod secured to said crank and to said ears, a bed-plate provided with guides on its side edges for supporting the knife-plate, an adjusting-strip arranged between the edge of the knife-plate and the guide on the edge of the bed-plate, adjusting-screws for adjusting said strip, transverse horizontal rods clamped to the bottom of the bed-plate fitted to openings in side plates and studs on the supporting-frame, and mechanism to shift said bed-plate a short distance from side to side, shifting the knives to cut a different portion of the block at each alternate cut.

12. In a machine for cutting match-splints, the knives of usual form and mechanism for shifting said knives to cut different portions of the block, having in combination the knife-plate, the bed-plate provided with guides on its side edges for supporting said knife-plate, rods clamped to the bottom of the bed-plate, side plates secured on a suitable supporting-frame provided with studs and perforations through said studs for receiving freely said rods, a shifting lever having double jaws pivotally secured to an arm on the frame, a cam engaging with said jaws, means for rotating said cam, and a connection between the shifting lever and bed-plate.

13. In a machine for cutting match-splints, the knives of usual form and mechanism for shifting said knives to cut different portions of the block, having in combination a knife-plate, a bed-plate provided with guides on its side edges for receiving and supporting said knife-plate, integral grooved flanges on the under side of said bed-plate, horizontal cross-rods clamped in the grooves of said flanges, side plates secured to a suitable supporting-frame provided with inwardly-extending studs and perforations through said studs and plates for receiving the ends of said cross-rods, a shifting lever pivotally secured on an arm on the frame formed on its upper end with double jaws, a rotating cam engaging with said jaws, means for rotating said cam, and a connection between said shifting lever and the bed-plate.

14. In a machine for cutting match-splints, the knives of usual form and mechanism for shifting said knives to cut different portions of the block, consisting of the combination of a knife-plate, a bed-plate provided with guides on its side edges for receiving and supporting said knife-plate, integral grooved flanges on the under side of said bed-plate, horizontal cross-rods clamped in the grooves of said flanges, side plates secured to a suitable supporting-frame provided with inwardly-extending studs and perforations through said studs and side plates for receiving the ends of said cross-rods, a shifting lever pivotally secured on an arm on the frame formed on its upper end with double jaws, a rotating cam engaging with said jaws, means for rotating said cam, a rod secured to an ear on the under side of the bed-plate, adjacent to said shifting lever and adjustably secured to said shifting lever by lock-nuts, and set-screws secured to the side plate for limiting the transverse motion of the bed-plate and the shift of the knives.

15. In a machine for cutting match-splints, the knives of usual form, and mechanism for horizontally reciprocating and shifting said knives having in combination the knife-bars to which the knives are secured, a knife-plate supporting said knife-bars and provided with rearwardly-extending ears and reinforcing-rubs, a bed-plate provided with guides on its side edges for receiving and supporting the knife-plate, an adjusting-strip arranged between the edge of the knife-plate and one of said guides, adjusting-screws secured to the outer edge of the bed-plate for adjusting said strip; a horizontal shaft formed with a double crank provided with a ball-and-socket bearing, a wrist-pin also provided with ball-and-socket bearing secured to the rearwardly-extending ears on knife-plate, an adjustable connecting-rod provided with sockets fitted to said ball-and-socket bearings connecting said crank to said wrist-pin, integral grooved flanges on the under side of the bed-plate, transverse rods clamped in said grooves, side plates secured on supporting-frame provided with inwardly-extending bosses and perforations through said bosses for receiving the ends of the transverse rods and permitting them to slide freely therein; a shifting lever pivotally secured to an arm on the frame and provided at its upper end with jaws, a cam engaging with said jaws, means for rotating said cam and supporting it on the frame, and a connecting-rod secured to an ear on the bottom of the bed-plate and passing through a perforation in said shifting lever to which it is adjustably secured by double lock-nuts.

16. In a machine for cutting match-splints, mechanism for guiding and feeding the blocks downwardly to the knives, having in combination the following elements: a suitable supporting-frame, a rear feed-plate arranged transversely and vertically and secured to said frame near the front of the machine, a front feed-plate arranged parallel to said rear plate and adjustably bolted thereto, said plates provided with integral corresponding ribs on their inner faces forming when the plates are secured in position inclined channels for receiving the blocks through openings in the side of the frame; journal-bearings in said plates, rollers journaled therein, for engaging with the blocks, one pair to each channel, means for rotating the rollers of each pair in opposite directions; the lower portion of the channels in said front plate being cut away, spring-plates arranged therein, yieldingly and adjustably secured by bolts and springs to said rear plate for engaging with the uncut portion of the block after it has passed out of engagement with said feeding-rollers, horizontally-reciprocating knives and means for operating them to cut the blocks.

17. In a machine for cutting match-splints, the combination of parallel and transversely-arranged feed-plates provided with channels for the blocks, one of said plates having the lower portion of each channel cut away, and a spring-plate fitted to said cut-out portion and secured yieldingly and adjustably to the other plate, said spring-plate having the upper portion of its face which makes contact with the block beveled, and its lower portion formed with a central depression, horizontally-reciprocating knives and means for operating them to cut the blocks.

18. In a machine for cutting match-splints, in combination with the parallel feed-plates, forming when secured together an inclined channel or channels for guiding the blocks to the knives and one of said plates having the lower portions of said channels cut away, spring-plates fitted to said cut-out portions, bolts for securing said spring-plates to the opposite feed-plate, springs arranged in connection with said bolts on the outer face of said plate to which the spring-plate is secured, for forming a yielding connection therewith, said spring-plate having the upper portion of its contact-face beveled, and the lower portion thereof cut away on an incline to correspond with the inclination of said channel, horizontally-reciprocating knives and means for operating them to cut the blocks.

19. In a machine for cutting match-splints, the combination of front and rear plates transversely arranged parallel to each other near the front of the machine, and provided on their inner faces with inclined, integral ribs forming inclined, parallel channels for guiding the blocks to the knives, said front plate having the lower portion of said channels cut away; spring-plates fitted to the cut-out portions of the front plate, and provided with bolts for securing them adjustably to the rear plate, spiral springs strung on the bolts on outer face of the rear plate, making in connection with nuts a yielding connection between the rear plate and the spring-plates, said spring-plates having the upper portion of their contact-faces beveled to receive the block, and the lower portion plane and cut out on an angle to correspond with the inclination of the channels, horizontally-reciprocating knives and means for operating them to cut the blocks.

20. In a machine for cutting match-splints, the combination of parallel feed-plates for confining and guiding the blocks to the knives, feed-rollers journaled in said plates for positively feeding the blocks, a lever having an outwardly-extending, lower arm and an upwardly-extending, upper arm, a pawl pivotally supported on said lower arm, and a spring for holding it in engagement with a ratchet-wheel, an antifriction-roller also secured on said lower arm, a rotating wheel provided with a cam engaging with said roller at each rotation of the wheel and rotating said ratchet-wheel intermittently, an extension on said upper arm, and a set-screw secured in the frame for bearing against said extension to elevate and depress the lower arm of said lever for regulating the amount of feed of said ratchet-wheel, an adjustable dog in engagement with said ratchet-wheel, a pinion secured to the ratchet-wheel and rotating intermittently therewith, and a chain of gears engaging with said pinion and with gears on said feed-rollers to rotate the feed-rollers of the pairs in opposite directions to feed positively and intermittently the blocks.

21. In a machine for cutting match-splints, the combination of a suitable supporting-frame, transverse parallel feed-plates supported thereon for confining and guiding the blocks between them, rollers journaled in pairs in said plates provided with bevel-gears on their upper ends for feeding the blocks, and in combination therewith mechanism for rotating said rollers, having in combination the following elements: a ratchet-wheel rotatably secured on the frame, a lever pivotally secured on the frame carrying a pawl engaging with the ratchet-wheel, a rotating wheel secured on the frame and provided with a cam projection for engaging with said lever at each rotation of the wheel, operating to elevate the pawl to rotate the ratchet-wheel intermittently, a pinion secured to said ratchet-wheel and rotating therewith, bevel-gears provided with hollow shafts journaled in a bracket secured to one of said feed-plates and engaging with bevel-gears secured on one of each pair of the rollers journaled in said plate, corresponding bevel-gears engaging with the other bevel-gears of each pair and secured on solid shafts journaled in the bracket secured to the opposite feed-plate and also journaled in said hollow shafts with which they form a sliding and rotating connection, a gear secured on one of said solid shafts and engaging with said pinion, gears secured on said hollow shafts and an intermediate gear between them, to rotate said hollow-shaft bevel-gears and said solid-shaft bevel-gears simultaneously and rotate the feed-rollers in opposite directions to feed the blocks.

22. In a machine for cutting match-splints, the combination of a suitable supporting-frame, a longitudinally, reciprocating, horizontal knife-plate supporting the cutting-knives, a horizontal transversely-shifting bed-plate supporting the knife-plate, feed-plates forming channels for guiding the blocks to the knives, rollers journaled in said feed-plates for positively feeding the blocks, endless chains carrying pairs of slats for removing the cut splints, and means for supporting said chains, worms engaging with said slats for forcing them apart to receive the splints and feed the chains, vertical shafts supporting said worms, arms secured on a rock-shaft engaging with said shafts for temporarily elevating them during rotation, and in combination with these elements means for operating them consisting of the following elements: a main shaft provided with a double crank and a connecting-rod therebetween and the knife-plate for reciprocating said knife-plate, a side shaft provided with gears engaging respectively with a gear on said main shaft and with a gear on the front shaft, the front shaft provided with gears engaging with gears on the worm-shafts for rotating said worm-shafts and worms, and provided with a rotating wheel formed with a cam-groove to rock the rock-shaft to temporarily elevate said vertical shafts and worms, and an intermediate gear on said side shaft engaging with a gear on a short shaft journaled in the frame through which by intermediate mechanism the shift is communicated to the bed-plate and through other intermediate mechanism an intermittent rotary motion to the feed-rollers.

In witness whereof I have hereunto set my hand, in the presence of two attesting witnesses, at Syracuse, in the county of Onondaga, in the State of New York, this 20th day of May, 1897.

EDWARD M. LOCKWOOD.

Witnesses:
   FREDERICK P. SCHENCK,
   L. F. WEISBURG.